United States Patent Office 3,346,143
Patented Oct. 10, 1967

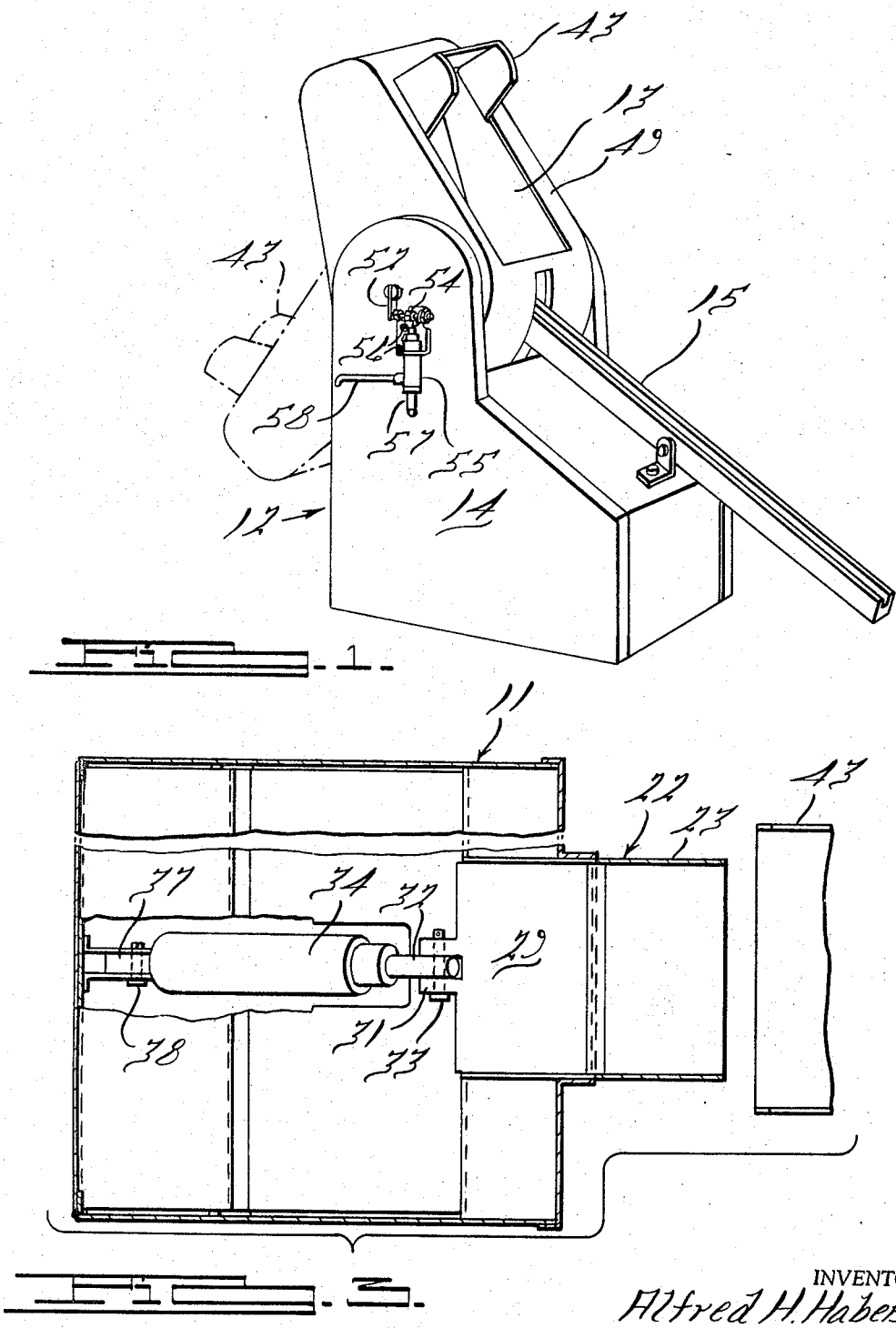

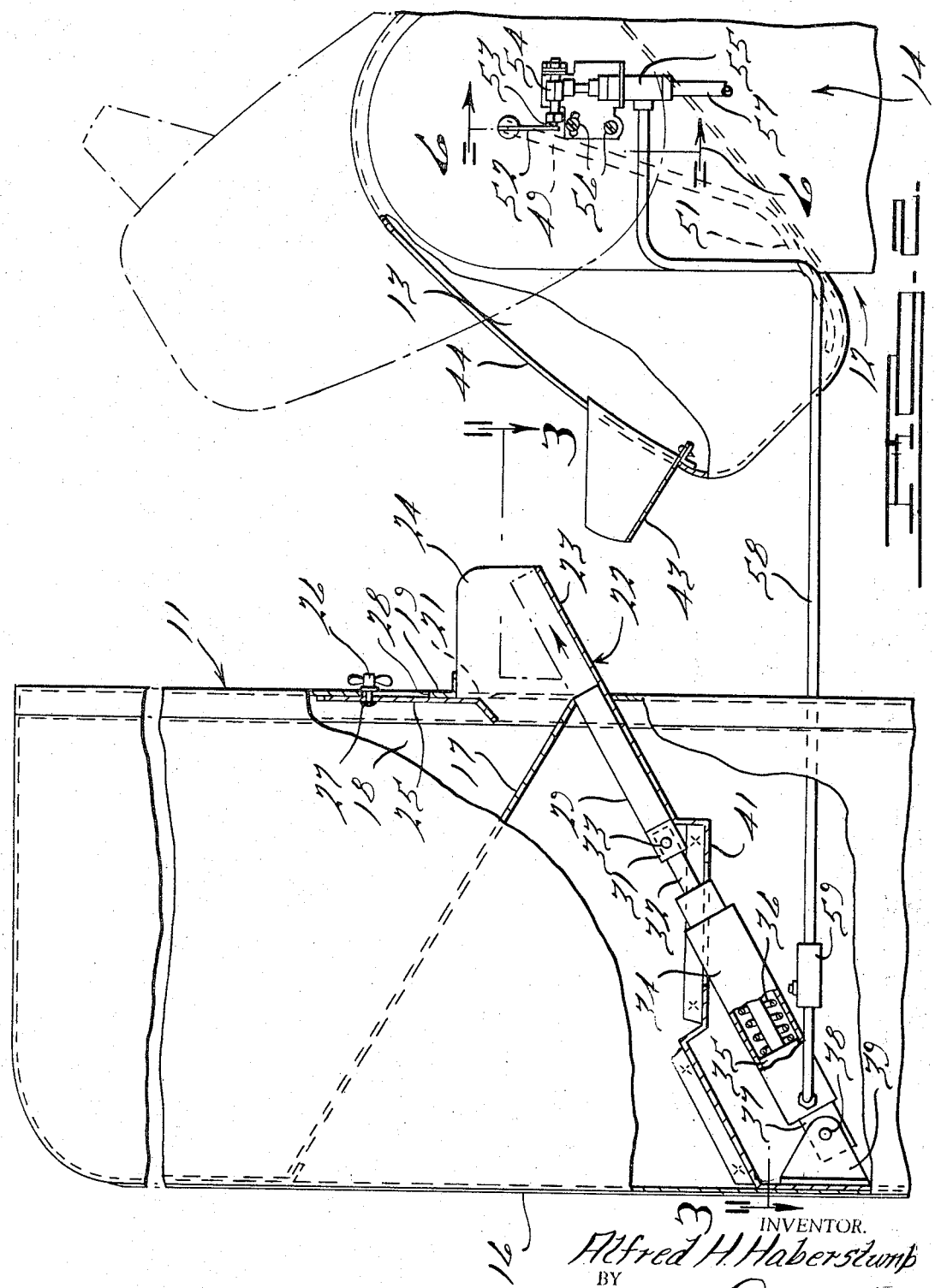

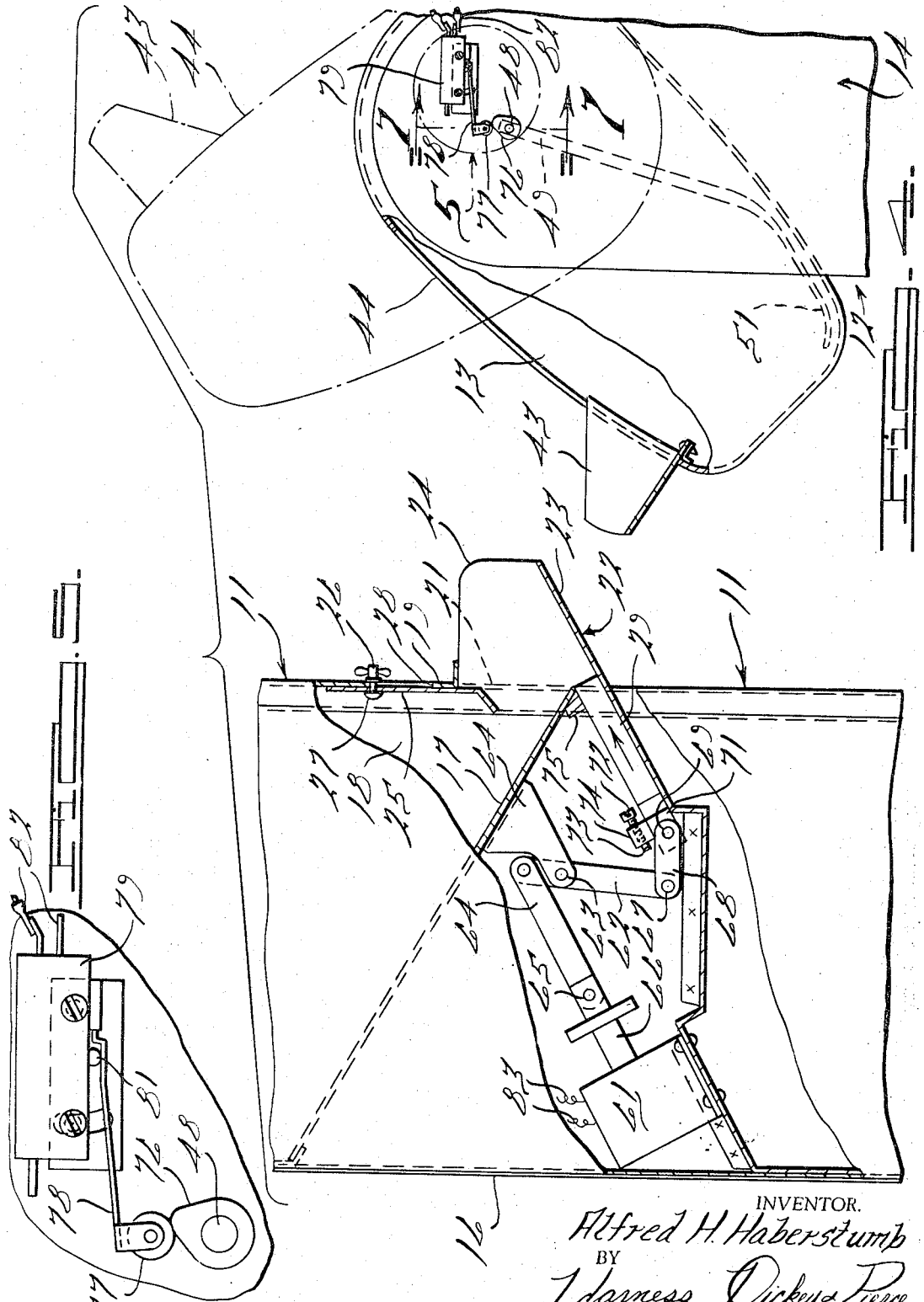

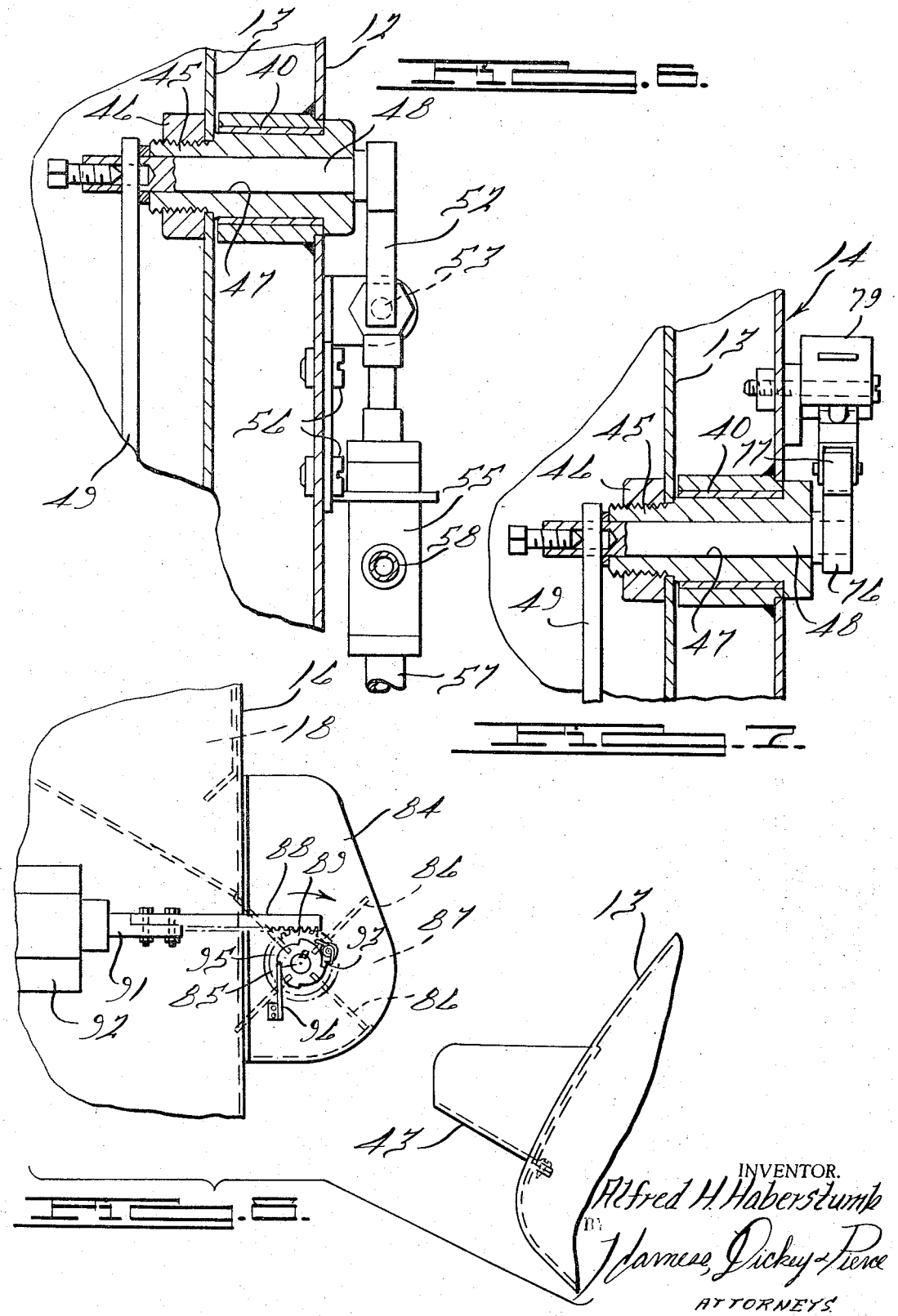

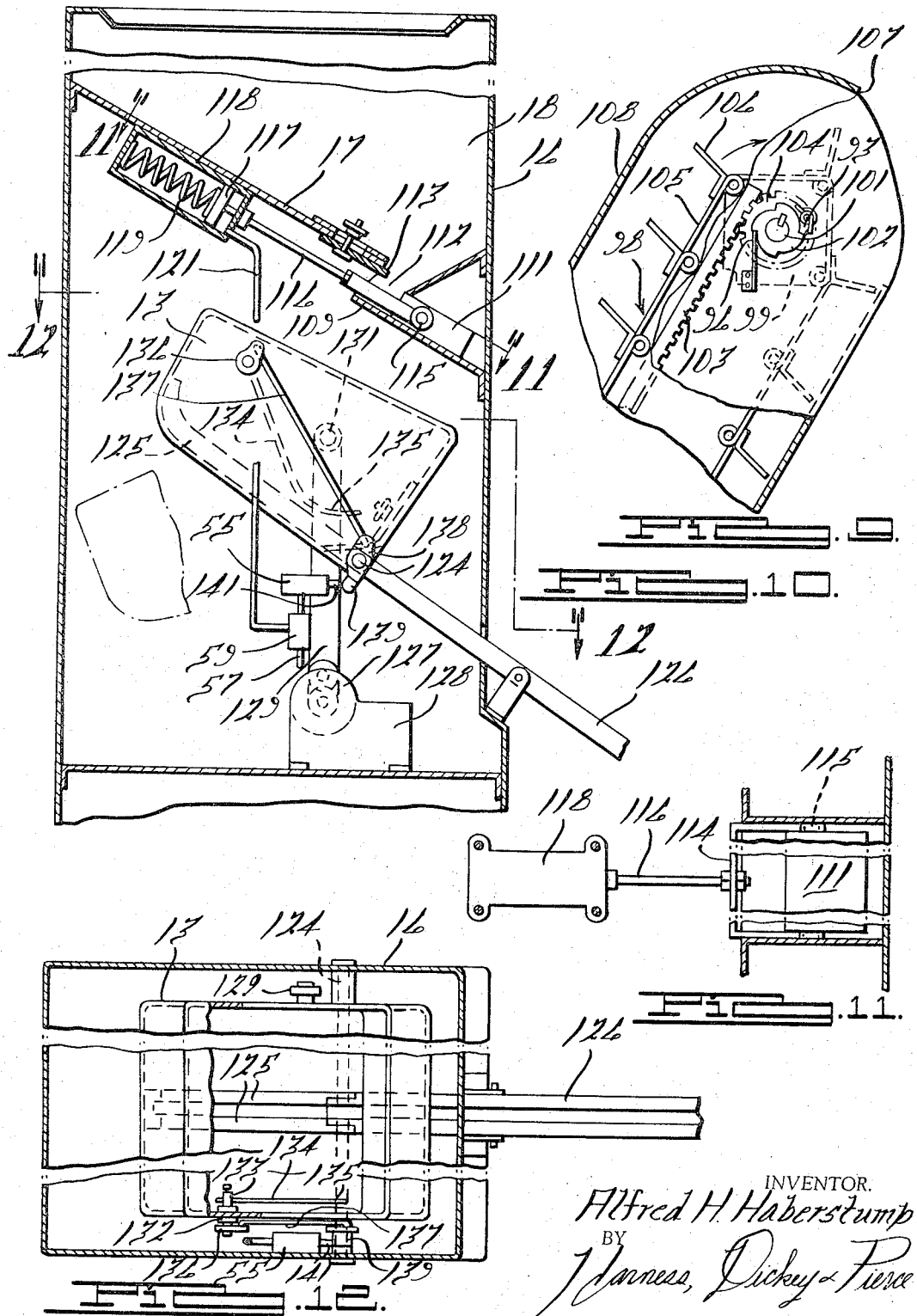

3,346,143
PARTS FEEDING DEVICE WITH DISCHARGING-RECEIVER CONTROLLED DELIVERY FROM SOURCE
Alfred H. Haberstump, 15125 Piedmont Ave., Detroit, Mich. 48223
Filed June 9, 1966, Ser. No. 556,465
6 Claims. (Cl. 222—56)

ABSTRACT OF THE DISCLOSURE

The invention pertains to a servicing hopper for a sorting receptacle for articles which are agitated by the oscillation of the receptacle on supporting trunions. A device within the hopper senses the need for additional articles and, when needed, produces the activation of the hopper delivers a number of the articles to the receptacle at a selected point in its path of oscillation during the time articles are needed.

This invention relates to feeding devices and particularly to a feeding device which delivers articles into a receptacle in accordance with the need thereof.

The article feeder of the present invention may be employed with different types of articles depleting devices and the present feeder has specific application for a sorting device having an oscillating receptacle for the articles. The feeder is so constructed as to feed a multiplicity of articles into the receptacle as indications are provided that more articles are needed during the oscillation thereof. The delivery can occur at either end of each oscillation or any point therebetween.

A pivoted arm is suspended in the oscillating receptacle which is retained from the bottom thereof when sufficient articles are present but which moves closer and closer toward the bottom as the articles become depleted. The pivotal shaft supporting the arm has an element thereon which actuates a device such as a switch, valve or the like, to energize a solenoid, a cylinder of a ram or other force applying instrumentality for rapidly moving an ejector to thereby deliver a number of the articles from the feeding device into the receptacle of the sorting device. As pointed out hereinabove this may occur near the end of down movement of the receptacle, near the end of the top movement thereof or at any point therebetween, depending upon the specific design of the feeding device and the oscillatable receptacle relative to other and adjacent machines or element.

Accordingly, the main objects of the invention are: to provide an article feeding device which is actuated by the oscillating receptacle of the sorting device when in low supply for periodically delivering a plurality of articles thereto; to provide an element within the receptacle of the sorting device for gauging the need of additional articles which thereupon actuates a servo mechanism for producing the delivery of a predetermined number of the articles into the receptacle; to locate an article feeding device adjacent to an oscillating receptacle timed to deliver a plurality of articles thereinto when the receptacle requires refilling; and in general, to provide a feeder device for an oscillating receptacle of a sorting device which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a perspective view of a sorting device having an oscillating receptacle containing articles to be sorted;

FIG. 2 is a broken view in elevation of a feeding device for the receptacle of the sorting device illustrated in FIG. 1;

FIG. 3 is a broken sectional view of the feeding device illustrated in FIG. 2;

FIG. 4 is a broken view in elevation of a feeding device, similar to that illustrated in FIG. 2, showing another form thereof;

FIG. 5 is an enlarged view of a portion of the structure illustrated in FIG. 4, as viewed within the circle 5 thereof;

FIG. 6 is an enlarged broken sectional view of the structure illustrated in FIG. 2, taken on the line 6—6 thereof;

FIG. 7 is an enlarged broken sectional view of the structure illustrated in FIG. 4, taken on the line 7—7 thereof;

FIG. 8 is a broken view of structure, similar to that illustrated in FIG. 2, showing another form of feeding device;

FIG. 9 is a view of structure, similar to that illustrated in FIG. 8, showing still another form of the invention;

FIG. 10 is a view of structure, similar to that illustrated in FIG. 2, showing another form which the invention may assume;

FIG. 11 is a broken sectional view of the structure illustrated in FIG. 10, taken on the line 11—11 thereof, and FIG. 12 is a broken sectional view of the structure illustrated in FIG. 10, taken on the line 12—12 thereof.

Referring to FIGS. 1 to 3 and 7, the feeding device 11 of the present invention is mounted adjacent to a sorting device 12 in which articles to be sorted are retained in a receptacle 13. The receptacle 13 oscillates on a stand 14 from an up position illustrated in solid lines to a down position illustrated in dot and dash lines. When the receptacle is in the down position the articles orient themselves on a track which when in the upper position delivers the oriented articles onto a collecting rail 15. The continued operation of the sorting device depletes the articles in the receptacle which must be watched and periodically filled manually. To avoid the extra cost of labor and shutdown of the sorting device because of lack of articles the delivering device of the present invention is utilized. The device is employed in combination with a sensing device associated with the receptacle for intermittently delivering articles to the receptacle until a substantial amount has been supplied. The supplying of articles in this manner does not interfere with the continuous operation of the sorting device.

The feeding device 11 comprises a four walled housing 16 having a sloping partition 17 forming a hopper 18. The forward wall 19 of the hopper has an opening 21 at the bottom of which an upwardly sloping channel shaped article receiving element 22 is secured. The element 22 has a wide web 23 and upstanding sides 24. The vertical height of the opening is adjusted by a plate 25 supported by a thumb nut 26 on a bolt 27 which is movable in a slot 28 in the front wall 19. The plate 25 limits the number of the articles which move from the hopper 18 onto the receiving element 22 after a number of articles have been delivered therefrom. An ejector 29 is carried within the element 22 for outward movement therein. The forward end of the ejector is aligned with the end of the partition 17 at the bottom of the opening 21.

A bifurcated boss 31 on the ejector receives the end of a piston rod 32 pivotaly secured thereto by a pin 33. The piston rod extends from one end of a cylinder 34 and is attached to a piston 35 sealed to the inner wall of the cylinder. A spring 36 urges the piston toward the bottom or left-hand end of the cylinder 34, as viewed in FIG. 2. The end of the cylinder has a projecting finger 37 which is secured by a pin 38 to a pair of arms 39 attached to a partition portion 41 extending rearwardly from the element 22 and welded or otherwise secured to the side walls of the housing 16.

A channel shaped receiving chute 43 is secured to the lower end of the opening 44 of the receptacle 13, as illustrated in FIG. 2, so that the outer end will pass closely to the end of the element 22 during the oscillating movement of the receptacle. As illustrated more specifically in FIG. 7, the receptacle 13 oscillates on a bearing 40 when secured to a bushing 45 by a nut 46. The bushing has a central aperture 47 containing a pin 48 which normally oscillates therewith. The independently rotatable pin 48 supports an arm 49 within the receptacle 13, the end portion 51 of the arm is disposed substantially parallel to the bottom of the receptacle. The end of the pin 48 extending outwardly of the support 14 of the sorting device has a finger 52 secured thereto and extending downwardly therefrom. The finger engages a ball 53 of a control element 54 for a valve 55 which is secured to the support 14 by screws 56 in a manner to be adjusted toward and away from the finger 52. When the finger 52 is moved to engage the ball 53 the ball is unseated within the element 54 and pressure therewithin is relieved so that the valve 55 will shift to deliver air from a supply conduit 57 to a conduit 58 through a flow control valve 59 which is connected to the bottom of the cylinder 34. This will rapidly drive the piston 35 and the ejector 29 forwardly and cause a plurality of the articles to be delivered from the element 22 outwardly thereof and into the receptacle 13. The ejector will advance to the dot and dash line position in the element 22 as clearly illustrated in FIG. 2.

Upon the upward movement of the receptacle 13 the finger 52 will move away from the ball 53 which will become seated and the valve 55 will shift to shut off the flow of fluid to the conduit 58 and the fluid therein and in the cylinder 34 will bleed therefrom through the exhaust part of the valve 55 permitting the spring 36 to return the piston 35 to the bottom of the cylinder. Upon the downward movement of receptacle 13, if additional articles are required, the finger 52 will again unseat the ball 53 and the ejector 29 will again be moved forward to deliver a plurality of articles to the receptacle 13. Upon the upward movement of the receptacle the finger 52 will move from the ball 53 shutting off the air to the conduit 58 and permitting the return of the piston 35 to the position illustrated in FIG. 2. This operation will continue until the delivered articles retain the end portion 51 of the arm 49 above the bottom of the receptacle an amount which will prevent the finger 52 from engaging the ball 53 whereupon the delivery of articles from the feeder mechanism to the sorting mechanism is interrupted. As the articles are being sorted and delivered from the rail 15, the depletion of the articles in the receptacle will permit the end portion 51 to move to a position adjacent the bottom of the receptacle and the finger 52 will again engage the ball 53 and actuate the cylinder and ejector to deliver more articles to the receptacle which will occur each downward movement of the receptacle until sufficient articles have been delivered to raise the end portion 51 of the arm 49 sufficiently so as to maintain the finger 52 out of contact with the ball 53. With this arrangement the inspection and labor required heretofor for manually filling the receptacle 13 is eliminated. The hopper 18 may be of substantial size so as to contain sufficient articles to repeatedly refill the receptacle 13 over a substantial length of time without inspection.

Referring to FIGS. 4, 5 and 6, a slightly modified form of the invention is illustrated that wherein the feeding device 11 has the ejector 29 operated by a solenoid 61. In this arrangement a lever 62 is pivoted adjacent one end by a pivot 63 to a pair of spaced arms 64 secured to the underside of the partition 17. The end of the upper or short arm of the lever 62 is connected to one end of a link 60 the opposite end of which is connected by a pivot 65 to an armature arm 66. The end of the long or lower arm of the lever 62 is secured by a pivot 67 to a link 68 which is secured by a pivot 69 to a finger 71 on the ejector 29. The length of the stroke of the arm 66 of the solenoid 61 is short and by using the multiplying lever 62, the movement of the ejector 29 will be substantially equal to that produced by the piston rod 32 of the structure illustrated in FIG. 2. The forward movement of ejector 29 may be stopped by a head 72 of a screw 73 supported in a boss 74 at the side of the ejector 29. The head 72 is aligned with a stop element 75 carried at the underside of the bottom end of the partition 17.

As illustrated in FIGS. 5 and 7, the outer end of the pin 48 carries a cam 76 which engages a roller 77 on an arm 78 of a switch 79, the arm being in engagement with an actuating element 81 of the switch. A circuit 82 from the switch is in circuit with the terminals 83 of the solenoid 61. The operation of the feeder is substantially the same as that employing the ram operated ejector of FIGS. 1 to 3 and 7. When the portion of the arm 51 keeps lowering as the articles in the receptacle 13 become depleted the cam 76 will finally engage the roller 75 and move it toward the switch 79 to thereby operate the actuating element 81 to complete the circuit and energize the solenoid 61. This will cause the armature arm 66 to be drawn against the coil of the solenoid and swing the lever 62 counterclockwise thereby moving the ejector 29 outwardly along the element 22 and deliver articles therefrom into the receptacle 13. As soon as sufficient of the articles have been delivered, each time the receptacle 13 moves to its downward position the end portion 51 will be retained away from the bottom of the receptacle and the cam 76 will no longer actuate the switch 79, the solenoid 61 will not be energized and the ejector 29 will not be moved forwardly. The receptacle 13 will continue to oscillate until such time that the articles therein have been depleted sufficiently to permit the end portion 51 of the arm 49 to again approach the bottom of the receptacle whereupon the cam 76 will be in a position to engage the roller 77 and operate the switch 79 whereupon additional articles will be delivered from the feeder into the receptacle until such time as the cam 76 will no longer actuate the switch 79 and the feeding will be interrupted.

In FIG. 8, a further form of the invention is illustrated that wherein the front wall 19 of the housing 16 has a channel shaped housing 84 supporting a rotor 85 containing four vanes 86 forming four quadrants 87. The rotor 85 is advanced 90° by a rack 88 and pinion 89 each time a piston 91 in a cylinder 92 is advanced therefrom. The pinion 89 carries a spring pressed pawl 93 which engages one of four notches of a ratchet element 95 secured to the shaft of the rotor 85. The piston 91 is actuated by the opening of the valve 55 in the manner as pointed out hereinabove when the arm portion 51 indicates that articles are required by the receptacle 13. The rotation of the pinion 89 by the rack advances the pawl 93 therewith and rotates the ratchet element 95 and rotor 85 90° to deliver the articles collected in the top sector 87 to the receptacle 13. Upon the upward movement of the receptacle the valve 55 will be closed and the piston within the cylinder 92 will be returned by the spring 36 as the air below the piston is bled from the conduit 58.

A spring element 96 engages a notch in the element 95 so that upon the return movement of the rack 88 and the pinion 89, the ratchet element 95 will be retained stationary to permit the return of the pawl 96 to the next adjacent notch thereof. This operation will be repeated until sufficient of the articles has been delivered to the receptacle 13 to retain the end portion 51 of the arm 49 above the bottom thereof and prevent the actuation of the valve 55.

In FIG. 9, a similar form to device to that of FIG. 8 is illustrated wherein a continuous link chain 98 operates about square rollers 99 at the bottom and top of the conveyor. The roller 99 at the top of the conveyor is mounted on a shaft 101 carrying a ratchet wheel 102 driven by a rack 103 and a pinion 104 which is freely rotatable on the shaft 101. The pinion 104 carries the spring pressed pawl 93 which engages a notch in the ratchet wheel 102 for advancing the chain 90° each time the rack is actuated. The spring element 96 engages a notch upon the return movement of the rack to prevent the shaft 101 for moving in the opposite direction to thereby permit the pawl 93 to return and engage the next adjacent notch of the ratchet wheel. Each of the links 105 has an upstanding fin 106 between which articles picked up in the hopper at the bottom of the chain are carried forward and thrown from an opening 107 in an enclosing housing 108 outwardly into the receptacle 13. Each time the arm portion 51 in the receptacle operates the valve 55, in the manner pointed out hereinabove, the fluid is delivered to a ram which actuates the rack 103 to advance a link 105 90° about the shaft 101 to deliver the articles collected thereon to the receptacle. When sufficient articles have been delivered to the receptacle, 13, the end portion 51 of the arm 49 will be raised sufficiently to prevent the actuation of the valve and the delivery of articles from the feeding device will be interrupted until such times that the end portion 51 of the arm again approaches the bottom of the receptacle in a manner pointed out hereinabove.

A still further form of the invention is illustrated in FIGS. 10, 11 and 12 wherein the feeding of articles to the receptacles takes place when the receptacle is at the top of its oscillating movement. The supporting housing 16 has a hopper 18 so located as to deliver articles from the partition 17 to a channel shaped receiving element 109 sloping upwardly from the housing 16. The receiving element 109 has an ejector 111 therein against which articles collect when passing through the opening 112 at the end of the partition. The size of this opening is controlled by a plate 113 to regulate the number of articles which collect upon the ejector 111. A forked element 114 has spaced arms connected to opposite sides of the ejector 111 by pins 115. A piston rod 116 is connected to the forked element 114 and to a piston 117 disposed within a cylinder 118 and abutting a spring 119 in the bottom thereof. A conduit 121 delivers fuel against the piston 117 on the side thereof opposite to the spring 119 for rapidly moving the piston toward the bottom of the cylinder 118. This rapidly moves the ejector 111 in the receiving element 109 to thereby deliver the articles into the receptacle 13 at a time where the receptacle is in its upper position. The conduit 121 is connected to a valve 55 through a regulating valve 59 joined to a supply source 57.

The receptacle is pivoted at its front lower corner on a pair of rods 124 the outer ends of which extend through the housing 16 and the inner ends of which join the collecting rails 126 to the receiving rails 126. The collecting rails are supported in the bottom of the receptacle while the receiving rails extend outwardly from the housing 16. The oscillation of the receptacle is produced by a crank 127 driven by a motor 128 and operating a Pittman 129 which is secured by a pivot 131 to the receptacle 13. A bushing 132 in an aperture located in the upper rear portion of one wall of the receptacle has an aperture in which a pin 133 rotates. Within the receptacle 13, one end of the pin 133 supports an arm 134 having an upwardly extending end portion 135. The other end of the pin extends outwardly of the receptacle and has a link 136 fixed thereto for pivotally supporting one end of a link 137. The opposite end of the link 137 is pivoted to one end of a lever 138 which is pivotally supported on the adjacent rod 124. The opposite end of the lever 138 is provided with an operating finger 139 which, when the receptacle is moving upwardly, moves to a position of engagement with an operating stem 141 of the valve 55. Upon the operation of the valve fluid is delivered to the cylinder 118 for rapidly moving the ejector 111 upwardly to deliver the articles from the receiving element 109 into the raised receptacle 13. The receptacle may be approaching its top position, or at its top position, or moving away from its top position, when the articles are delivered thereinto. As the articles are delivered in the receptacle, they will move beneath the extending end portion 135 until sufficient has been received to raise the arm 134 away from the bottom of the receptacle. When the arm has been raised a predetermined amount the finger 139 on the link 138 will no longer engage the stem 141 of the valve 55 each oscillation of the receptacle and fluid will no longer be delivered through the conduit 121 to the cylinder 118. The delivering apparatus is thereby made inoperative in which condition it will remain until the articles within the receptacle are becoming depleted to a degree that the arm 135 can move downwardly and rotate the lever 138 to advance the finger 139 to a position where it again engages the stem 141 as the receptacle oscillates. The stem operates the valve 55 to have fluid delivered to the cylinder 118 which operates the ejector and delivers articles to the receptacle until such quantity has been delivered as to raise the arm sufficiently from the bottom of the receptacle to have the finger 139 move out of engagement with the stem 141 during the oscillation of the receptacle.

It will be seen in these arrangements that various types of delivery elements may be employed for replenishing those left in the receptacle 13 of the sorting device. It will also be noted that a switch, valve or other means can be employed for producing the actuation of the ejector for delivering the articles. It will also be noted that the feeding device may be timed to deliver the articles to the receptacle in any of its positions of oscillation, at the top, bottom or any point therebetween. The device is unique in that a day's supply of articles may be carried by the hopper from which they are periodically delivered to the receptacle as indications are provided by the arm therewithin that additional articles are required. It is only necessary to provide one supporting bushing having the pin 48 therein and a mount for the valve, switch or other actuating element on the side of the sorting device to produce a structure operable in combination with the feeding device. By having side walls on the receiving element and the chute at the bottom of the opening in the receptacle spillage of the articles is avoided as they are delivered from the hopper to the receptacle. The feeding device is so mounted when feeding at the bottom, top or at any point therebetween during the oscillation of the receptacle that no interference will occur with the operation of the sorting device or other equipment adjacent thereto.

What is claimed is:

1. In a device for feeding articles into a receptacle which oscillates in a path between a position adjacent to the device, at which position articles discharged from the device will be received by the receptacle, and a position remote from the device, means in said receptacle for sensing the need for articles, and means actuated by said sensing means when articles are required, for activating said feeding device in timed relation to the arrival of the receptacle at said adjacent position.

2. In a device for feeding articles as recited in claim 1, wherein said receptacle oscillates from a top to a bottom position and the articles are delivered into the receptacle near the bottom of its oscillating movement.

3. In a device for feeding articles into a receptacle as recited in claim 1, wherein said receptacle oscillates from a top to a bottom position and the articles are delivered into the receptacle near the top of its oscillating movement.

4. In a device for feeding articles as recited in claim 1, wherein a metered group of articles are fed to the receptacle each cycle of oscillation thereof during the time the articles are needed.

5. In a device for feeding articles as recited in claim 1, wherein said sensing means is a pivoted arm which is raised by the articles within the receptacle, an element outside of the receptacle carried by the pivot of said arm, a support for said receptacle, and a servo mechanism on said support actuated by said element when the arm has been substantially lowered due to the reduction of articles within the receptacle.

6. In a device for feeding articles as recited in claim 5, wherein a hopper stores a quantity of the articles, means associated with the hopper for collecting a predetermined number of said articles, and means for delivering said collected articles into said receptacle.

References Cited
UNITED STATES PATENTS

| | | | |
|---|---|---|---|
| 1,650,278 | 11/1927 | Kingsbury et al. | 222—56 X |
| 2,763,400 | 9/1956 | Francis | 222—56 |
| 2,921,713 | 1/1960 | Zanotto et al. | 222—56 |

SAMUEL F. COLEMAN, *Primary Examiner.*